US008918799B2

(12) United States Patent
Inglett et al.

(10) Patent No.: US 8,918,799 B2
(45) Date of Patent: Dec. 23, 2014

(54) METHOD TO UTILIZE CORES IN DIFFERENT OPERATING SYSTEM PARTITIONS

(75) Inventors: Todd A. Inglett, Rochester, MN (US); Yoonho Park, Chappaqua, NY (US); Bryan S. Rosenburg, Cortlandt Manor, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/435,100

(22) Filed: Mar. 30, 2012

(65) Prior Publication Data

US 2013/0263157 A1 Oct. 3, 2013

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................................ 719/319

(58) Field of Classification Search
None
See application file for complete search history.

(56) References Cited

U.S. PATENT DOCUMENTS

| 6,151,684 | A | * | 11/2000 | Alexander et al. ........... 714/4.21 |
| 7,761,687 | B2 | | 7/2010 | Blumrich et al. |
| 8,024,742 | B2 | | 9/2011 | Lescouet et al. |
| 8,261,249 | B2 | | 9/2012 | Archer et al. |
| 8,370,614 | B2 | | 2/2013 | Dalton et al. |
| 8,447,912 | B2 | | 5/2013 | Archer et al. |
| 2008/0059676 | A1 | | 3/2008 | Archer et al. |
| 2008/0059677 | A1 | * | 3/2008 | Archer et al. .................. 710/262 |
| 2010/0082788 | A1 | | 4/2010 | Mundy |
| 2010/0162265 | A1 | * | 6/2010 | Heddes .......................... 719/314 |
| 2010/0229183 | A1 | * | 9/2010 | Bae et al. ....................... 719/315 |
| 2011/0191783 | A1 | | 8/2011 | Le Moal |
| 2011/0219208 | A1 | | 9/2011 | Asaad et al. |
| 2011/0271126 | A1 | * | 11/2011 | Hill ................................ 713/320 |
| 2012/0173730 | A1 | * | 7/2012 | Krumpe, Jr. .................. 709/226 |
| 2012/0260123 | A1 | * | 10/2012 | Madampath ................... 714/4.1 |
| 2012/0331243 | A1 | | 12/2012 | Aho et al. |
| 2012/0331307 | A1 | * | 12/2012 | Fernandez Gutierrez .... 713/190 |
| 2013/0054859 | A1 | * | 2/2013 | Berezecki ...................... 710/264 |

FOREIGN PATENT DOCUMENTS

WO 2010064277 A1 6/2010

OTHER PUBLICATIONS

Mark Giampapa, Thomas Gooding, Todd Inglett, Robert W. Wisniewski. "Experiences with a lightweight supercomputer kernel: Lessons learned from Blue Gene's CNK" Proceedings of the 2010 ACM/IEEE International Conference for High Performance Computing (SC10). New Orleans, LA. Nov. 2010.

(Continued)

*Primary Examiner* — H S Sough
*Assistant Examiner* — William C Wood
(74) *Attorney, Agent, or Firm* — Scully, Scott, Murphy & Presser, P.C.; Daniel P. Morris, Esq.

(57) ABSTRACT

A system call utility may be provided on a first operating system managing a first hardware computing entity. The system call utility may take as an argument a pointer to a computer code a second operating system established to run on the first hardware computing entity. The first operating system is enabled to execute the computer code natively on the first hardware computing entity, and return a result of the computer code executed on the first hardware computing entity to the second operating system.

24 Claims, 4 Drawing Sheets

(56) References Cited

OTHER PUBLICATIONS

Juan A. Colmenares, Sarah Bird, Henry Cook, Paul Pearce, David Zhu, John Shalf, Steven Hofmeyr, Krste Asanović, John Kubiatowicz "Resource management in the Tessellation manycore OS. Proceedings of the 2nd USENIX Workshop on Hot Topics in Parallelism" (HotPar 2010). Berkeley, CA. Jun. 2010.

David Wentzlaff, Charles Gruenwald III, Nathan Beckmann, Kevin Modzelewski, Adam Belay, Lamia Youseff, Jason Miller, Anant Agarwal "An operating system for multicore and clouds: Mechanisms and implementation. Proceedings of the 1st ACM Symposium on Cloud Computing" (SoCC 2010). Indianapolis, IN. Jun. 2010.

John Lange, Kevin Padretti, Trammell Hudson, Peter Dinda, Zheng Cui, Lei Xia, Patrick Bridges, Andy Gocke, Steven Jaconette, Mike Levenhagen, Ron Brightwell "Palacios and Kitten: New high performance operating systems for scalable virtualized and native supercomputing" Proceedings of the 24th IEEE International Parallel and Distributed Processing Symposium (IPDPS 2010). Atlanta, GA. Apr. 2010.

Kazutomo Yoshii, Kamil Iskra, P. Chris Broekema, Harish Naik, Pete Beckman "Characterizing the performance of Big Memory on Blue Gene Linux" Proceedings of the 22nd International Workshop on Parallel Programming Models and Systems Software for High-End Computing , (P2S2 2009) Vienna, Austria. Sep. 2009.

Jonathan Appavoo, Volkmar Uhlig, Amos Waterland, Bryan Rosenburg, Dilma Da Silva, Jose Moreira. Kittyhawk "Enabling cooperation and competition in a global shared computational system" IBM Journal of Research and Development Aug. 2009.

Silas Boyd-Wickizer, Haibo Chen, Rong Chen, Yandong Mao, Fraans Kaashoek, Robert Morris, Aleksey Pesterev, Lex Stein, Ming Wu, Yuehua Dai, Yag Zhang, Zeng Zhang. Corey "An operating system for many cores" Proceedings of the 8th USENIX Conference on Operating Systems Design and Implementation (OSDI 2008). San Diego, CA. Dec. 2008.

Edi Shmueli, George Almási, Jose Brunheroto, Jose Castaños, Gabor Dózsa, Sameer Kumar, Derek Lieber "Evaluating the effect of replacing CNK with Linux on the compute-nodes of Blue Gene/L" Proceedings of the 22nd ACM International Conference on Supercomputing (ICS 2008), Island of Kos, Greece. Jun. 2008.

Arnd Bergmann "Linux on Cell Broadband Engine status update. Linux Symposium" Ottawa, Canada. Jun. 2007.

Hayden Kwok-Hay So, Artem Tkachenko, Robert Brodersen, "A unified hardware/software runtime environment for FPGA-based reconfigurable computers using BORPH" Proceedings of the 4th International Conference on Hardware/Software Codesign and System Synthesis (CODES+ISSS 2006), Seoul, Korea. Oct. 2006.

Notice of Allowance mailed Mar. 12, 2014 in related U.S. Appl. No. 13/435,014.

* cited by examiner

METHOD TO UTILIZE CORES IN DIFFERENT OPERATING SYSTEM PARTITIONS

FIELD

The present application relates generally to computers and operating system kernels, and more particularly to utilizing computing entities such as cores in different operating system partitions.

BACKGROUND

Mark Giampapa et al. (Mark Giampapa, Thomas Gooding, Todd Inglett, Robert W. Wisniewski. Experiences with a lightweight supercomputer kernel: Lessons learned from Blue Gene's CNK. Proceedings of the 2010 ACM/IEEE International Conference for High Performance Computing (SC10). New Orleans, La. November 2010) outlines the different approaches taken by high performance computing (HPC) operating system kernels. The kernels fall into a spectrum defined at one end by Light-Weight Kernels (LWKs) and at the other end by Full-Weight Kernels (FWKs). Generally, LWKs such as Compute Node Kernel (CNK) from IBM® Corporation, Armonk, N.Y., provide higher performance and scalability than FWKs such as Linux but less functionality. LWKs achieve higher performance and scalability because they give applications direct access to physical resources. FWKs maintain ownership of physical resources and arbitrate access among many applications. LWKs have less functionality than FWKs because LWKs are specialized.

Linux is an example of FWK that runs on many different platforms and has a large developer base. There have been attempts to bridge the gaps between LWKs and FWKs. These approaches may fall into two categories: (1) add FWK functionality to an LWK; and (2) improve FWK performance for HPC applications. Application performance has many aspects including efficiency, scalability, and reliability. In the present disclosure, performance refers to overall application performance, measured by time to completion.

BRIEF SUMMARY

A method and a system for utilizing cores managed by different operating systems may be provided. The method, in one aspect, may comprise providing a system call utility on a first operating system managing a first hardware computing entity. The system call utility may take an argument comprising a pointer to computer code a second operating system established to run on the first hardware computing entity. The second operating system may manage an application that includes a call to the system call utility, to run on a second hardware computing entity. The method may further comprise enabling the first operating system to execute the computer code natively on the first hardware computing entity and to return a result of the computer code executed on the first hardware computing entity to the second operating system. The second operating system managing the application running on the second hardware computing entity may be enabled to utilize the first hardware computing entity via the system call utility.

A system to utilize one or more hardware computing entities managed by different operating systems in a computer system, in one aspect, may comprise a first hardware computing entity. The system may also comprise a first operating system managing the first hardware computing entity. The system may further comprise a second hardware computing entity managed by a second operating system. The second operating system may be running as a process within the first operating system. The system may further comprise a system call utility provided with the first operating system, the system call utility taking an argument comprising a pointer to computer code the second operating system established to run on the first hardware computing entity. The second operating system may manage an application that includes a call to the system call utility, to run on the second hardware computing entity. The first operating system may be enabled to execute the computer code natively on the first hardware computing entity and to return a result of the computer code executed on the first hardware computing entity to the second operating system. The second operating system managing the application running on the second hardware computing entity may be enabled to utilize the first hardware computing entity via the system call utility.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
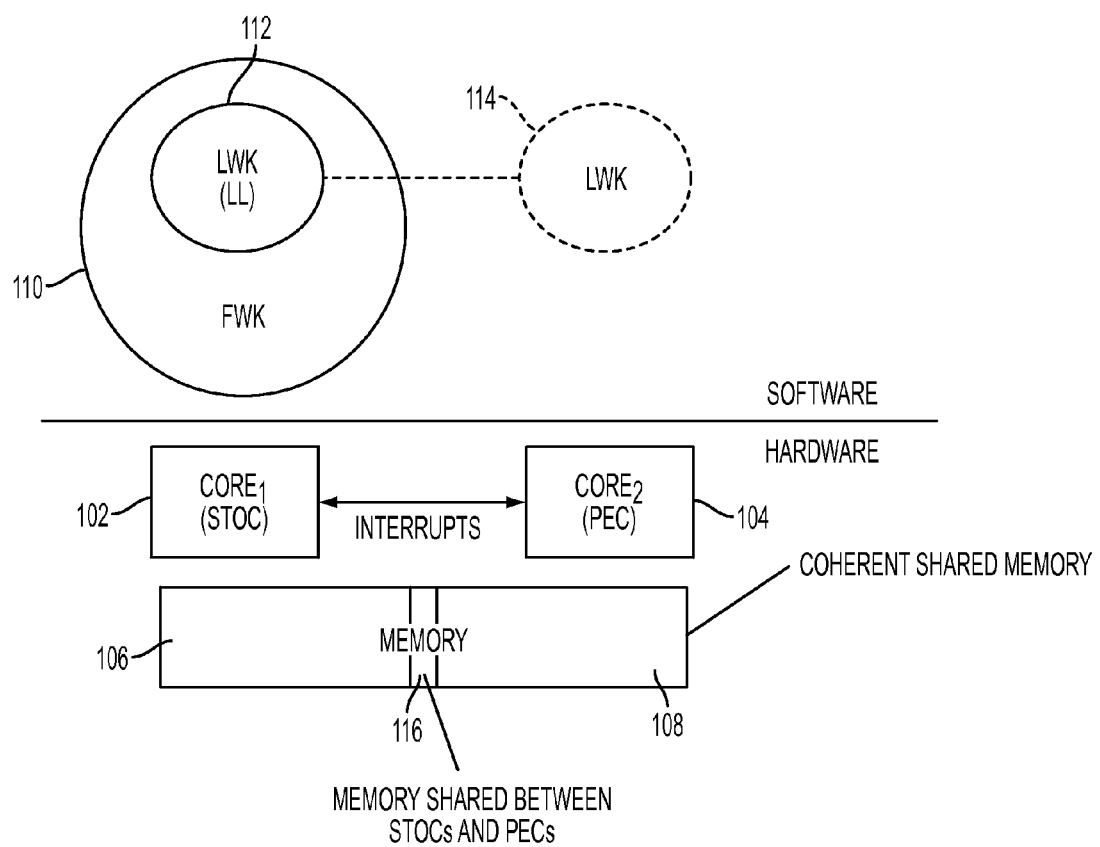
FIG. 1 shows a general overview of operating system structure of the present disclosure in one embodiment.

FIG. 1 shows an operating system structure of the present disclosure in one embodiment. An FWK 110 operates as the base operating system and the LWK 112 is partially virtualized as a guest. The FWK 110 runs on a subset of computing entities such as the cores 102. The LWK Library (LL), which is derived from the LWK 112, runs as an FWK process and runs on the remaining computing entities, e.g., cores 104. LWK 112 may manage those cores 104 (e.g., PEC) via hardware support or small software monitor. LWK 112 manages the cores 104 (e.g., PEC) but runs within FWK 110. Memory 106 may be divided between the FWK 110 an LWK 112. This division provides the LWK 112 with large, contiguous regions of memory and allows the LL to avoid memory management overhead.

Briefly, a process of an operating system refers to an execution stream (sequence of instructions) and has its own set of registers, stacks, memory, and other physical resources, when it is executing on a machine. A process may include one or more threads (execution streams), each thread having its own registers and stacks; but a thread within a process can access another thread's memory and registers within the same process.

The FWK 110 may be modified to partition the physical memory at boot time and to redirect one or more selected system calls and exception to the LL. In one aspect, only those parts of the LWK may be selected to be virtualized to provide good performance and scalability. Examples of virtualized parts of the LWK in one embodiment of the present disclosure include memory management and thread scheduling functionalities.

In the following description, Linux is used as an example FWK. It should be understood, however, that the present disclosure does not limit the methodologies disclosed herein only to Linux; rather other FWK or the like may apply. The present disclosure also describes cores as examples of hardware computing entities; however, it should be understood that the methodologies of the present disclosure also may apply to other computing entities such as a hardware thread, hardware core, or other hardware defined mechanism for executing a logical instruction stream.

Referring to FIG. 1, cores or other hardware computing entities 102, 104 may be partitioned between FWK and LWK. The memory may be also partitioned between the FWK and LWK allocated cores as shown at 106, 108. In other embodiments, the memory need not be partitioned. FWK 110 (e.g., Linux) runs as usual on one set of cores, e.g., Single-Thread Optimized Cores or STOCs 102. LWK 112 (e.g., CNK) is virtualized within a FWK (e.g., Linux) process and manages the other set of cores 104, e.g., Power-Efficient Cores or PECs 104. STOCs 102 and PECs 104 represent the potential heterogeneity that fused OS comprising FWK 110 and LWK 112 can manage. In one embodiment of the present disclosure, STOCs 102 may be targeted for serial computation and any required system processing, while PECs 104 may be targeted for parallel computation. STOCs 102 have features found in high-performance, general-purpose processors such as strong integer performance and out-of-order execution. PECs 104 are optimized for power and space and have a subset of STOC features and need not contain capabilities such as supervisor mode. In one embodiment of the present disclosure, fused OS are designed to be optimized for a coherent shared memory 106, 108 between and across STOCs 102 and PECs 104.

An LWK library that encapsulates LWK functionality or portions thereof, may manage PECs 104. An example LWK library is the Compute Library (CL), a Linux application that encapsulates CNK functionality. It is built from CNK source code and runs as a user process on Linux. In one embodiment of the present disclosure, the LL 112 may cooperate with a small software monitor on the PEC 104 that acts mainly as an exception and system call handler. In another embodiment of the present disclosure, LL 112 may employ hardware support directly to start and stop a PEC 104 and to handle PEC exceptions, for example via interrupts and shared memory between the FWK cores and LWK cores.

FWK applications run on the cores allocated for FWK, and LWK applications run on the cores allocated for LL. For example, Linux applications run on the Linux cores in the usual manner. They are loaded by the standard ld.so, which loads and initializes the Executable and Linking Format (ELF) segments in the Linux memory partition and begins executing the application code. Briefly, the ELF is a standard portable object file format that works for a variety of operating systems and defines how an object file is composed and organized. ELF segments include information about application code and are mapped to virtual memory areas for execution. In one embodiment of the present disclosure, the LL replaces ld.so or FWK's dynamic loader or the like for LWK applications. The LL loads and initializes the ELF segments in the LL memory partition and begins executing application code on a free LL core. When an exception such as a system call or a page fault occurs on a LL core, control is passed back to the LL. After the exception is serviced, the LL resumes the LL core. The LL creates a Linux thread for each LL core that it allocates. This thread is used to service exceptions generated by application code running on the LL core. This allows the LL to handle multiple asynchronous requests such as file I/O on behalf of the application code running on the LL cores.

In one embodiment of the present disclosure, the hardware may provide the following hardware support: (1) allocate a LL core, (2) read/write the state of a LL core, (3) start/resume a LL core, and (4) after a LL core exception, pass control to a FWK (e.g., Linux) core. In another aspect, firmware or software may select one or more LL cores and make them available to a FWK or LL.

Referring to FIG. 1, FWK (e.g., Linux) applications may run as usual on STOCs 102. Applications that run on LWK (e.g, CNK on Blue Gene/Q or on other LWKs) may run "out of the box" on the PECs. To run a LWK (e.g., CNK) application, the LL 112 (e.g., CL) or the like requests a PEC 104, loads the LWK (e.g., CNK) application into the memory region 108 assigned to the PEC 104, stores startup information in a memory area 116 shared with the PEC 104, then requests the PEC 104 to start the application. A clone( ) system call or the like results in a new thread being started. The thread may run on the same PEC or another PEC. This approach allows Fused OS to support any thread-based runtime such as OpenMP. In one embodiment of the present disclosure, a LL 112 (e.g., CL) is started for each LWK (e.g., CNK) application, in the FWK 110 as a FWK process. In one embodiment of the present disclosure, a LL (e.g., CL) thread 114 is started for each LWK (e.g., CNK) application thread. The LL (e.g., CL) thread 114 handles the system calls and exceptions generated by the corresponding LWK (e.g., CNK) application thread. The LL (e.g., CL) thread 114 may handle the system calls in the same manner in which LWK (e.g., CNK) handles systems call for LWK (e.g., CNK) applications, e.g., shipping functions to FWK 110 (e.g., Linux).

When a LWK (e.g., CNK) application thread makes a system call or encounters an exception, the PEC hardware 104 may send an interrupt to the FWK hardware 102 and store the system call or exception information in the shared memory area 116, then pass control to LL (e.g., CL) thread 114. Thus, exceptions occurring in a core 104 running LWK application are delivered to another core, e.g., STOC or the core that is hosting the LL. In another embodiment, such hardware support or functions may be emulated, for example, by utilizing a monitor (e.g., small scale), interprocessor interrupt (IPI) mechanism and shared memory between the FWK cores and LWK cores.

LL (e.g., CL) thread 114 is an FWK (e.g., Linux thread) and therefore can service the system call or handle exceptions. After the LL (e.g., CL) thread 114 services the system call or handles the exception, it resumes the LWK (e.g., CNK) application thread. After the LL handles an exception for an application, the LL may restart or kill the application, for instance, depending on the types of the exception. For example, in the case of system calls or other non-fatal exceptions, the application may be restarted with the result of the system call or other data associated with the exception; In the case of fatal exceptions, the application may be killed. Examples of fatal exceptions are those that the application cannot handle.

More details of an LWK running within a FWK and managing one or more hardware computing entities that are allocated to run LWK applications are described in co-pending co-owned U.S. patent application Ser. No. 13/435,014 entitled, "Method to Embed a Light-Weight Kernel in a Full-Weight Kernel to provide a Heterogeneous Execution Environment", filed on even date, which is incorporated herein by reference in its entirety.

The programming model in one embodiment of the present disclosure, for example, shown in FIG. 1 allows a FWK application to run as usual on a hardware computing entity (e.g., referred to as a first hardware computing entity for sake of explanation) allocated for that application, while a LWK application allocated to run on another hardware computing entity (e.g., referred to as a second hardware computing entity for sake of explanation) may be started on that second hardware computing entity by a LL, which is an instance of LWK running as FWK process. For example, the first hardware computing entity may be a core of one type, and the second hardware computing entity may be a core of another type, the different types of cores on a computing system making up a heterogeneous computing system. New software threads may be started on the same second hardware computing entity or another (e.g., third) hardware computing entity, e.g., created with pthread_create( ).

The methodology of the present disclosure may be able to support any thread-based runtime, for example, in the programming model, and allow for an FWK application to utilize all cores and an LWK application to utilize all cores. In one embodiment of the present disclosure, an FWK system call is provided that allows an LWK application to invoke code on an FWK core or another hardware computing entity. An LWK application refers to an application started by an LWK. LWK application, for example, is written and/or compiled to run on a specific hardware entity, e.g., a PEC. An FWK application refers to an application started by an FWK. An FWK core refers to a hardware computing entity such as a STOC allocated to be managed by FWK. An LWK core refers to a hardware computing entity allocated to be managed by an LWK that is running on a FWK core. Rather than only running FWK applications on STOCs and LWK applications on PECs, the methodology of the present disclosure in one embodiment allows an FWK or LWK application to run on both STOCs and PECs, utilizing all the hardware computing entities.

In heterogeneous multi-core processors or like heterogeneous computing systems, application code is compiled for the different cores or hardware computing entities. For example, the FWK cores may have a different Instruction Set Architecture (ISA) than the LWK cores because they are targeting different workloads. The decision of where to run application code can be specified by the application writer through mechanisms such as pragmas, or the runtime utility or middleware may attempt to make decisions during execution.

The FWK system call of the present disclosure in one embodiment allows application code running on an LWK core to invoke application code on an FWK core. The FWK system call may have a single argument, the location of the application code to invoke on the FWK core. In another embodiment of the present disclosure, an additional argument may be added to specify the FWK core to use. With the provision of the FWK system call in the present disclosure, both LWK and FWK applications may be started on an LWK core. For example, an LWK core can run an FWK application that has been compiled for both the STOC and PEC.

Figure 2:
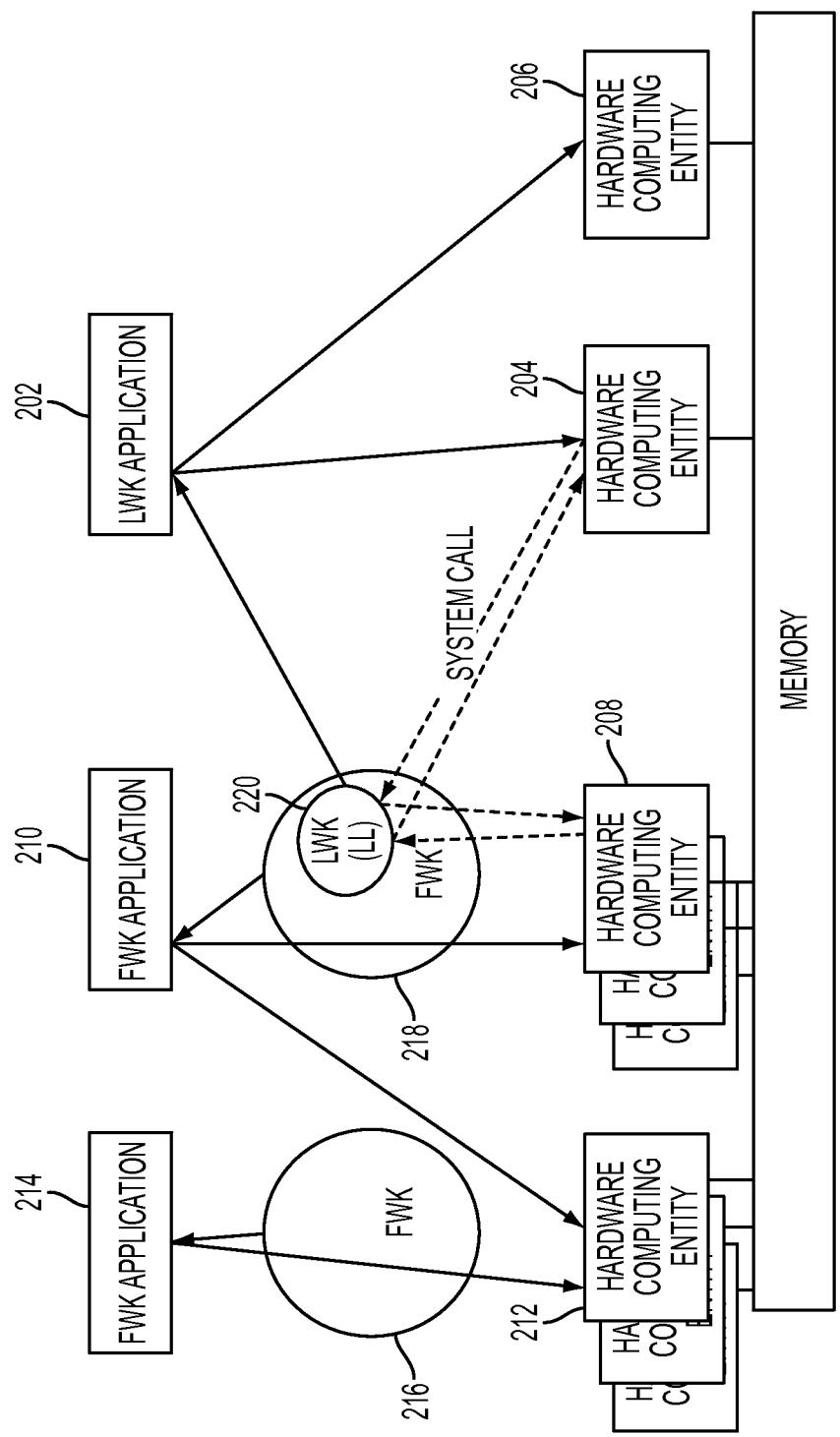
FIG. 2 illustrates an example schematic of different operating systems managing heterogeneous multi-core processors or the like and enabling applications to utilize the cores of the different operating system in one embodiment of the present disclosure.

FIG. 2 illustrates example schematic of different operating systems managing heterogeneous multi-core processors or the like and enabling applications to utilize the cores of the different operating system in one embodiment of the present disclosure. A single FWK 218 may manage a set of cores or hardware computing entities 208. An LWK application 202 can be started on an LWK core 204 by LWK 220 and utilize other LWK cores 206 through additional threads. Additional threads may be started by the LWK application itself with pthread_create( ) or the runtime. OpenMP is an example of a runtime that will start threads on behalf of the application. The LWK application 202 can utilize FWK cores 208 with the system call of the present disclosure.

An FWK application 210 may be started on an FWK core 208 by a FWK 218 and utilize other FWK cores 212 through additional threads. The FWK core 212 may also have a FWK 216 managing it and an FWK application 214 started on it.

In this example, an LWK application 202 executing on a LWK core 204 may utilize an FWK core 208 by way of a system call provided in the present disclosure. As shown by the dotted arrows, the system call invoked in the LWK application 202 is communicated to the LWK 220 managing the core 204. LWK 220 in turn invokes the code specified in the system call, which code runs on the FWK 208 via the FWK 218. Any resulting values from executing the code specified in the system call may be returned back to the LWK core 204. The communication of the system call between the cores 204 and 208 and LWK 220 may be handled by using one or more interrupt and shared memory mechanisms, for instance, as described above with reference to FIG. 1, and also as described in co-owned and co-pending U.S. patent application entitled, "Method to Embed a Light-Weight Kernel in a Full-Weight Kernel to provide a Heterogeneous Execution Environment." The LWK 220 runs within the FWK 218, for instance, as a FWK process and therefore, FWK's utilities are available and accessible to the LWK 220.

Figure 3:
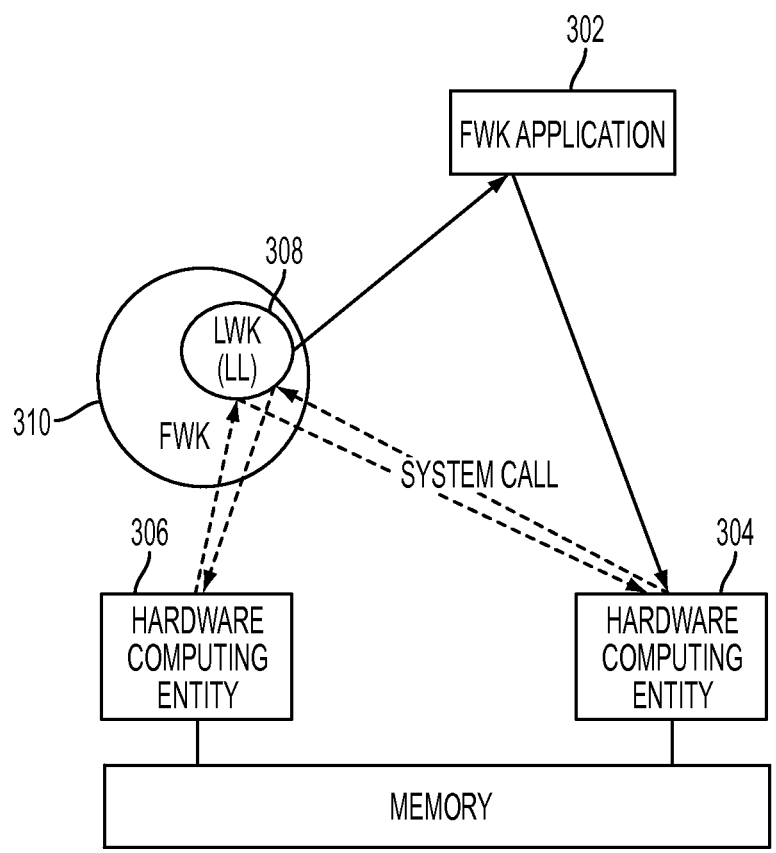
FIG. 3 illustrates another example schematic of different operating systems managing heterogeneous multi-core processors or the like and enabling applications to utilize the cores of the different operating system in one embodiment of the present disclosure.

FIG. 3 illustrates another example schematic of different operating systems managing heterogeneous multi-core processors or the like and enabling applications to utilize the cores of the different operating system in one embodiment of the present disclosure. In this example, having an FWK application 302 started on an LWK core 304 enables the FWK application 302 to take advantage of the system call of the present disclosure and utilize both FWK core 306 and LWK core 304. An FWK application 302 may be started on an LWK core 304, for instance, by an LWK 308 running within an FWK 310, for example, as described above with reference to FIG. 1.

In the example shown in FIG. 3, an FWK application 302 executing on a LWK core 304 may utilize an FWK core 306 by way of a system call provided in the present disclosure. As shown by the dotted arrows, the system call invoked in the FWK application 302 is communicated to the LWK 308 managing the core 304. LWK 308 in turn invokes the code specified in the system call, which code runs on the FWK core 306 via the FWK 310. Any resulting values from executing the code specified in the system call may be returned back to the LWK core 304. The communication of the system call between the cores 304 and 306 and LWK 308 may be handled by using one or more interrupt and shared memory mechanisms, for instance, as described above with reference to FIG. 1, and also as described in co-owned and co-pending U.S. patent application entitled, "Method to Embed a Light-Weight Kernel in a Full-Weight Kernel to provide a Heterogeneous Execution Environment." The LWK 308 runs within FWK 310, for instance, as a FWK process and therefore, FWK's utilities are available and accessible to the LWK 308.

While the examples in FIG. 2 and FIG. 3 referred to FWKs and LWKs as the different operating managing cores or the like in heterogeneous multi-core processors, it should be understood that the different operating system need not be specifically FWKs and LWKs; rather, the system call of the present disclosure may be used to utilize cores managed by other types of operating systems.

Figure 4:
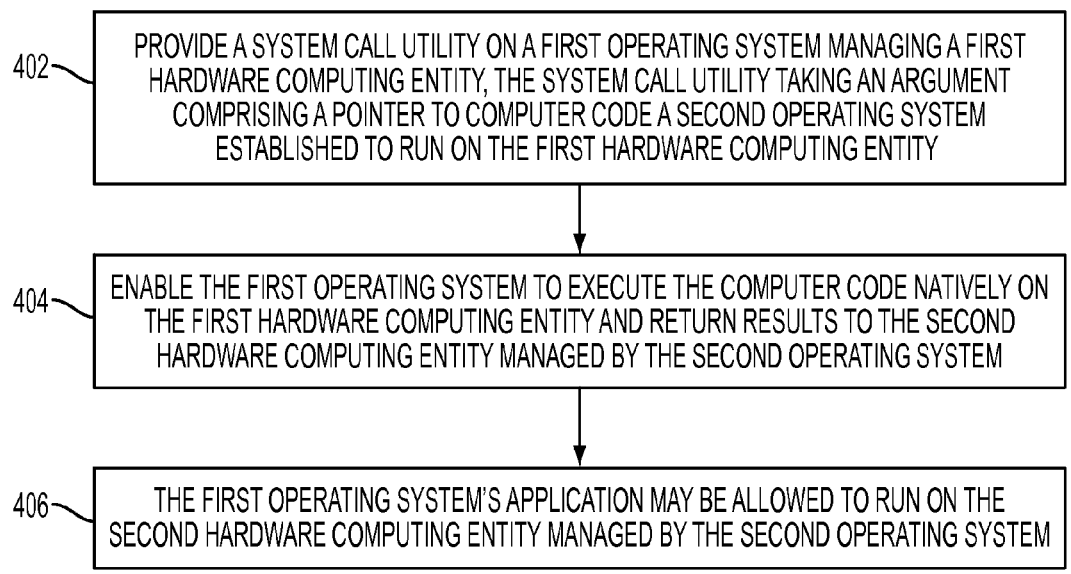
FIG. 4 is a flow diagram illustrating a method of utilizing hardware computing entities managed by different operating systems in one embodiment of the present disclosure.

FIG. 4 is a flow diagram illustrating a method of utilizing hardware computing entities managed by different operating systems in a computer system, in one embodiment of the present disclosure. For instance, the computer system contains at least two processing elements or hardware computing entities such as cores, and a memory connecting them. The hardware computing entities may be of different types, such as different types of cores. The method in one embodiment of the present disclosure allows an operating system code managing a hardware computing entity to utilize all the hardware computing entities in the computer system, and allows a different operating system managing another hardware computing entity in the computer system to utilize all computing entities in the computer system.

Referring to FIG. 4, at 402, a system call utility may be provided on a first operating system. The system call utility, in one embodiment, takes as an argument or parameter, a pointer to the code another operating system (e.g., a second operating system) established to run on one or more hardware computing entities that are managed by the first operating system. In another embodiment, the system call may take additional argument that is the specification or identification of one or more hardware computing entities on which to run the specified code.

At 404, the first operating system is enabled to execute the computer code natively on the first hardware computing entity. The first operating system may return a result to the second hardware computing entity managed by the second operating system. For example, the second operating system, which is executing on the first hardware computing entity within the first operating system, may run an application code on the second hardware computing entity, which application code includes the system call. The second hardware computing entity on encountering the system call in the code it is running may interrupt the first hardware computing entity, and write the data associated with the system call in a memory shared between the first hardware computing entity and the second computing entity. The data includes the system call and one or more arguments to the system call. The second operating system handles the interrupt on the first hardware computing entity and the system call, for instance, by executing the computer code specified in the argument of the system call. The second operating system executes the computer code specified in the argument of the system call on the first hardware computing entity. In another embodiment of the present disclosure, the system call may also include an identity or specification of which one or more hardware computing entities to execute the computer code. In that case, the second operating system executes the computer code specified in the system call on the specified hardware computing entity. The specified one or more hardware computing entities are those managed by the first operating system.

In another aspect, for example, at 406, to run a first operating system application on the first operating system and the second operating system, the first operating system application may be compiled for the second operating system, and the compiled application may be started using the second operating system running within the first operating system. The first operating system application may be able to use the first operating system through the system call of the present disclosure in one embodiment. For example, to run an FWK application on the STOCs and PECs, the FWK application may be compiled for the PEC and started by using an LL. The FWK application is able to utilize the STOCs (e.g., hardware components) through the system call mechanism of the present disclosure in one embodiment. In this aspect, the second operating system should support the services needed by the FWK application.

In one aspect, the second operating system may run as a process of the first operating system under the first hardware computing entity, and the second operating system runs an application invoking the system call utility on the second hardware computing entity. An example of the first operating system is a Full-Weight Kernel (FWK). An example of the second operating system is a Light-Weight Kernel (LWK).

The system call utility of the present disclosure in one embodiment is an OS to OS call mechanism, providing for OS protection capability. The mechanism in one embodiment provides global protection, e.g., across the whole second operating system's address space, rather than just an isolated "pocket" or protection. This allows the second operating system to behave and/or interact with itself in the normal manner an OS would.

One of the jobs of an operating system is to isolate applications from each other and to protect the operating system itself. In the present disclosure, this may be accomplished with memory mapping and treating a STOC as a PEC. For example, when the LL starts application code on the PEC, the PEC monitor and context can be protected by memory mapping them properly. If application code is started on a STOC as just another LL thread, the PEC context is exposed. To protect the context, a STOC may be treated like a PEC, e.g., separate it from the FWK and have the LL manage it remotely. While not all applications require this level of protection, the mechanism of the present disclosure in one embodiment may provide such protection.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method to utilize one or more hardware computing entities managed by different operating systems in a computer system, comprising:
providing a system call utility on a first operating system managing a first hardware computing entity, the system call utility taking an argument comprising a pointer to computer code a second operating system established to run on the first hardware computing entity, the second operating system for managing an application that includes a call to the system call utility, to run on a second hardware computing entity;
enabling the first operating system to execute the computer code natively on the first hardware computing entity and to return a result of the computer code executed on the first hardware computing entity to the second operating system,
wherein the second operating system managing the application running on the second hardware computing entity is enabled to utilize the first hardware computing entity,
wherein the second operating system runs as a process of the first operating system under the first hardware computing entity,
the first hardware computing entity and the second hardware computing entity being processing elements of the computer system that comprises at least two processing elements, the first operating system and the second operating system being high performance computing (HPC) operating system kernels,
wherein the first operating system managing the first hardware computing entity is allowed to utilize all hardware computing entities in the computer system, and the second operating system managing the second hardware computing entity is allowed to utilize all computing entities in the computer system via the system call.

2. The method of claim 1, wherein a memory connects the first hardware computing entity and the second hardware computing entity.

3. The method of claim 1, wherein the second hardware computing entity notifies the second operating system of the invoked system call utility via a hardware interrupt and the memory.

4. The method of claim 1, wherein the first operating system is a Full-Weight Kernel.

5. The method of claim 1, where the second operating system is a Light-Weight Kernel.

6. The method of claim 1, wherein the system call utility takes an additional argument containing a selected hardware computing entity managed by the first operating system on which to execute the computer code referenced by the pointer.

7. The method of claim 1, wherein the first hardware computing entity is a core of a first type, and the second hardware computing entity is a core of a second type.

8. The method of claim 1, wherein the application is compiled for the first hardware computing entity and the second hardware computing entity, wherein the compiled application for the second hardware computing entity is started on the second hardware computing entity by using a library instance of the second operating system running as a process within the first operating system.

9. A system to utilize one or more hardware computing entities managed by different operating systems in a computer system, comprising:
a first hardware computing entity;
a first operating system managing the first hardware computing entity;
a second hardware computing entity managed by a second operating system, the second operating system running as a process within the first operating system;
a system call utility provided with the first operating system, the system call utility taking an argument comprising a pointer to computer code the second operating system established to run on the first hardware computing entity,
wherein the second operating system manages an application that includes a call to the system call utility, to run on the second hardware computing entity, the first operating system enabled to execute the computer code natively on the first hardware computing entity and to return a result of the computer code executed on the first hardware computing entity to the second operating system, wherein the second operating system managing the application running on the second hardware computing entity is enabled to utilize the first hardware computing entity,
the first hardware computing entity and the second hardware computing entity being processing elements of the computer system that comprises at least two processing elements, the first operating system and the second operating system being high performance computing (HPC) operating system kernels,
wherein the first operating system managing the first hardware computing entity is allowed to utilize all hardware computing entities in the computer system, and the second operating system managing the second hardware computing entity is allowed to utilize all computing entities in the computer system via the system call.

10. The system of claim 9, further including a memory that connects the first hardware computing entity and the second hardware computing entity.

11. The system of claim 10, wherein the second hardware computing entity notifies the second operating system of the invoked system call utility via a hardware interrupt and the memory.

12. The system of claim 9, wherein the first operating system is a Full-Weight Kernel.

13. The system of claim 9, where the second operating system is a Light-Weight Kernel.

14. The system of claim 9, wherein the system call utility takes an additional argument containing a selected hardware computing entity managed by the first operating system on which to execute the computer code referenced by the pointer.

15. The system of claim 9, wherein the first hardware computing entity is a core of a first type, and the second hardware computing entity is a core of a second type.

16. The system of claim 9, wherein the application is compiled for the first hardware computing entity and the second hardware computing entity, wherein the compiled application for the second hardware computing entity is started on the second hardware computing entity by using a library instance of the second operating system running as a process within the first operating system.

17. A computer readable storage medium, excluding a signal per se, storing a program of instructions executable by a machine to perform a method to utilize hardware computing entities managed by different operating systems in a computer system, the method comprising:

providing a system call utility on a first operating system managing a first hardware computing entity, the system call utility taking an argument comprising a pointer to computer code a second operating system established to run on the first hardware computing entity, the second operating system for managing an application that includes a call to the system call utility, to run on a second hardware computing entity;

enabling the first operating system to execute the computer code natively on the first hardware computing entity and to return a result of the computer code executed on the first hardware computing entity to the second operating system, wherein the second operating system managing the application running on the second hardware computing entity is enabled to utilize the first hardware computing entity, wherein the second operating system runs as a process of the first operating system under the first hardware computing entity, the first hardware computing entity and the second hardware computing entity being processing elements of the computer system that comprises at least two processing elements, the first operating system and the second operating system being high performance computing (HPC) operating system kernels, wherein the first operating system managing the first hardware computing entity is allowed to utilize all hardware computing entities in the computer system, and the second operating system managing the second hardware computing entity is allowed to utilize all computing entities in the computer system via the system call.

18. The computer readable storage medium of claim 17, wherein a memory connects the first hardware computing entity and the second hardware computing entity.

19. The computer readable storage medium of claim 18, wherein the method further comprises enabling the second hardware computing entity to notify the second operating system of the invoked system call utility via a hardware interrupt and the memory.

20. The computer readable storage medium of claim 17, wherein the first operating system is a Full-Weight Kernel.

21. The computer readable storage medium of claim 17, wherein the second operating system is a Light-Weight Kernel.

22. The computer readable storage medium of claim 17, wherein the method further comprises enabling the system call utility to take an additional argument containing a selected hardware computing entity managed by the first operating system on which to execute the computer code referenced by the pointer.

23. The computer readable storage medium of claim 17, wherein the first hardware computing entity is a core of a first type, and the second hardware computing entity is a core of a second type.

24. The computer readable storage medium of claim 17, wherein the method further comprising enabling the application to be compiled for the first hardware computing entity and the second hardware computing entity, wherein the first hardware computing entity comprises at least a single-thread optimized core and the second hardware computing entity comprises at least a power-efficient core, and enabling the compiled application for the second hardware computing entity to be started on the second hardware computing entity by using a library instance of the second operating system running as a process within the first operating system.

* * * * *